(12) United States Patent
Shively et al.

(10) Patent No.: US 8,617,715 B2
(45) Date of Patent: Dec. 31, 2013

(54) FIRE RETARDANT SHADES

(75) Inventors: Timothy M Shively, Ferrum, VA (US); Arnim Ottokar Bothe, Bielefeld (DE)

(73) Assignee: CPFilms Inc., Fieldale, VA (US)

( * ) Notice: Subject to any disclaimer, the term of this patent is extended or adjusted under 35 U.S.C. 154(b) by 0 days.

(21) Appl. No.: 10/729,587

(22) Filed: Dec. 6, 2003

(65) Prior Publication Data

US 2005/0123769 A1   Jun. 9, 2005

(51) Int. Cl.
- *B32B 3/10* (2006.01)
- *B32B 3/30* (2006.01)
- *B32B 15/08* (2006.01)
- *B32B 27/06* (2006.01)
- *B32B 27/36* (2006.01)

(52) U.S. Cl.
USPC ........ 428/423.7; 428/131; 428/179; 428/458; 428/480; 428/921

(58) Field of Classification Search
USPC .......... 160/113, 130; 428/458, 615, 131, 179, 428/480, 423.7
See application file for complete search history.

(56) References Cited

U.S. PATENT DOCUMENTS

| | | | |
|---|---|---|---|
| 3,043,709 A | 7/1962 | Amborski | |
| 4,115,617 A * | 9/1978 | Mitsuishi et al. | 428/336 |
| 4,185,086 A * | 1/1980 | Zeitz | 424/69 |
| 4,425,981 A | 1/1984 | Kiesewetter et al. | |
| 4,555,433 A * | 11/1985 | Jablonka et al. | 428/166 |
| 4,557,980 A | 12/1985 | Hodnett, III | |
| 4,978,181 A * | 12/1990 | Inanuma et al. | 359/360 |
| 5,618,626 A | 4/1997 | Nagashima et al. | |
| 5,665,801 A * | 9/1997 | Chang et al. | 524/125 |
| 5,740,649 A * | 4/1998 | Fuchs et al. | 52/506.06 |
| 6,007,901 A | 12/1999 | Maschwitz et al. | |
| 6,221,112 B1 | 4/2001 | Snider | |
| 6,416,872 B1 | 7/2002 | Maschwitz | |
| 6,420,451 B1 | 7/2002 | Lin et al. | |
| 6,440,551 B1 | 8/2002 | Enniss et al. | |
| 6,569,928 B1 * | 5/2003 | Levchik et al. | 524/115 |
| 6,773,778 B2 | 8/2004 | Onozawa et al. | |
| 6,998,425 B2 | 2/2006 | Chisholm et al. | |
| 2003/0036604 A1 | 2/2003 | Meisenburg et al. | |
| 2004/0209020 A1 | 10/2004 | Castiglione et al. | |
| 2004/0242735 A1 | 12/2004 | McMan et al. | |

(Continued)

FOREIGN PATENT DOCUMENTS

| | | |
|---|---|---|
| DE | 197 54 107 C1 | 2/1999 |
| DE | 100 34 197 A1 | 1/2002 |

(Continued)

OTHER PUBLICATIONS

Kasten, Dr. Uwe; "Organic Light Stabilizers for Industrial Coatings"; Ciba Spezialitatenchemie Lampertheim GmbH, Jun. 2000.

(Continued)

*Primary Examiner* — Kevin R Kruer
(74) *Attorney, Agent, or Firm* — Eric D. Middlemas

(57) ABSTRACT

A fire retardant solar control sun shade comprising as the shade material, a clear transparent film composite comprising a first transparent film layer, preferably with a metallized layer on one side, and a further transparent film layer adhered to said one side of the first film layer using an adhesive, the adhesive and at least one of said two polymeric film layers contain fire retardant material.

13 Claims, 3 Drawing Sheets

(56) References Cited

U.S. PATENT DOCUMENTS

| | | |
|---|---|---|
| 2005/0121665 A1 | 6/2005 | Gillissen et al. |
| 2006/0134400 A1 | 6/2006 | Takada et al. |
| 2006/0216524 A1 | 9/2006 | Klun et al. |
| 2008/0166569 A1 | 7/2008 | Gasworth et al. |
| 2009/0162592 A1 | 6/2009 | Baikerikar et al. |
| 2009/0181242 A1 | 7/2009 | Enniss et al. |
| 2011/0027553 A1 | 2/2011 | Enniss et al. |

FOREIGN PATENT DOCUMENTS

| | | | |
|---|---|---|---|
| JP | 05230281 A | | 7/1993 |
| JP | 05230281 | * | 9/1993 |
| JP | 2004277629 A | | 10/2004 |
| KR | 10-0759101 B1 | | 9/2007 |
| WO | 96/06885 | * | 3/1996 |
| WO | WO 99/29979 A1 | | 6/1999 |
| WO | WO 9929979 A1 | | 6/1999 |
| WO | 01/68360 | * | 9/2001 |
| WO | WO 01/68360 A1 | | 9/2001 |
| WO | 01/74960 | * | 10/2001 |
| WO | WO 2006/008518 A1 | | 1/2006 |
| WO | WO 2009/087575 A2 | | 7/2009 |

OTHER PUBLICATIONS

Sartomer Company, Inc.; Technical Data Sheet: CN962, Aug. 2013.
Sartomer Company, Inc.; Technical Data Sheet: CN983, Aug. 2013.
USPTO Office Action for U.S. Appl. No. 12/812,010 dated Oct. 9, 2012.
USPTO Office Action for U.S. Appl. No. 12/812,010 dated May 8, 2013.
USPTO Office Action for U.S. Appl. No. 12/812,010 dated Jul. 25, 2013.
International Search Report for International Application No. PCT/EP2004/013518 mailed Jun. 30, 2005.
International Search Report for international Application No. PCT/IB2009/005001, mailed Jul. 20, 2009.
Copending U.S. Appl. No. 12/812,010, filed Sep. 27, 2010, Enniss et al.
Copending U.S. Appl. No. 13/433,920, filed Mar. 29, 2012, Port et al.
International Search Report for International Application No. PCT/US2012/031520 mailed Oct. 31, 2012.

* cited by examiner

FIRE RETARDANT SHADES

FIELD OF THE INVENTION

This invention relates to a composite material for shades or blinds used inside glazing to provide shading from sunlight and which may also be used as sound absorbers.

BACKGROUND OF THE INVENTION

Sun shades or blinds which are constructed from horizontal or vertical slats of a composite of laminated polymeric materials are well known. Such blinds are located inside the window glass of a building to protect the interior of the building from sun light. Typical shade materials are opaque or translucent but such materials have a disadvantage in that in use they block the outlook from the interior of the building.

In order to make the environment with a building more pleasant for the occupants, there has been a movement towards clear transparent shade materials. These materials may be tailored to control the transmission of visible and invisible light. A typical known transparent composite shade material typically comprises a layer of raw PET (polyethyleneterephthalate) film which is aluminised on its inner surface (the side away from the window) with a further layer of dyed or clear uv absorbing PET film adhered to the aluminium layer. In some constructions a further layer of dyed or UV absorbing PET film may alternatively or additionally be adhered to the outer surface.

It is desirable that polymeric shade materials when used within building have fire retardant properties. However, the fire retardants when added to the shade materials in sufficient quantities to be effective cause light scatter resulting in a loss of clarity and transparency. This is acceptable for opaque and translucent shade materials but not in transparent shade materials and therefore to-date clear transparent shade composite materials are not sufficiently fire retardant to meet the latest EEC fire regulations.

STATEMENTS OF THE INVENTION

According to the present invention there is provided a clear transparent shade or blind material comprising a composite having a first transparent polymeric film layer with a further transparent polymeric film layer adhered thereto using an adhesive, wherein the adhesive and at least one of said two polymeric film layers contain fire retardant material, the composite having a visible light transmission of between 1-90% and a haze value of less than 10%, The first polymeric film layer may have a metallized layer thereon with the adhesive being applied to the metallized layer.

The metallized layer is preferably a vacuum deposition of aluminum or an aluminum alloy, preferably having a visible light transmission of 15-30%.

The two polymeric film layers are preferably made from PET film and at least the further layer includes a UV absorbing material. A UV absorbing PET film is as disclosed in U.S. Pat. No. 6,221,112 and blocks up to 99% of UV-A (320-400 nm) and UV-B (280-320 nm) rays.

Said further film layer may be dyed to any suitable colour for example, bronze, green, blue, grey or may be clear as is desired.

The adhesive is preferably a transparent polyurethane resin which contains a fire retardant such that the composite when the adhesive is cured preferably has a haze value of about 5% or less.

The haze is measured using a Hunter Laboratories Ultrascan XE and calculated according to (Diffuse Transmittance/Total Transmittance)×100 over a light range of 380-780 nm.

The preferred fire retardants are brominated and/or phosphorus based compounds for example, a tetrabromo bis phenol "A" or an organophosphorus oligomer such as resorcinol bis(diphenyl phosphate). The dried adhesive may contain 5-15% by weight of the fire retardant.

The composite preferably has a visible light transmission of between 2-30% and typically 2-15%.

The invention further includes a solar control shade comprising as the shade material a clear transparent film composite comprising a first transparent polymeric film layer with a further transparent polymeric film layer adhered thereto using an adhesive, wherein the adhesive and at least one of said two polymeric film layers contain fire retardant material, the composite having a visible light transmission of 1-90% and a haze value of less than 10%.

The first film layer may have a metallized layer thereon and the adhesive is applied to the metallized layer.

Preferably, the adhesive is a polyurethane resin and preferably the composite has a haze value of about 5% or less.

The preferred fire retardant materials are brominated and/or phosphorus based compounds for example, a tetrabromo bis phenol "A" or an organophosphorus oligomer such as resorcinol bis(diphenyl phosphate) and the dried adhesive may contain 5-15% by weight of the fire retardant.

The film composite may also be used for the manufacture of substantially planar sound absorbing elements such that the elements may have a dual function acting as both sound absorbers and as light shades. The film composite may be provided with micro-perforations in a similar manner to that described in U.S. Pat. No. 5,740,649 (Fuchs et al) or DE-A-10034197 or in a similar manner to that disclosed in the product sold under the Trade name "Microsorber" by the Fraunhofer Institute in which micro-perforations (holes of less than 0.5 mm dia.) are formed in polycarbonate sheet material at a hole spacing of about 2.0 mm.

The sound absorbing elements may be hung as is described in WO 99/29979.

An alternative form of sound deadening element is described in U.S. Pat. No. 4,555,433, in which the sheet material is formed with adjacent cup shaped recesses in the form of a grid.

DESCRIPTION OF THE DRAWINGS

The invention will be described by way of example and with reference to the accompanying drawings in which.

DETAILED DESCRIPTION OF THE INVENTION

Figure 1:
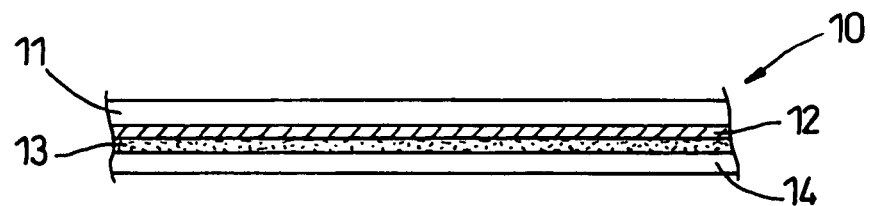
FIG. 1 is a cross-section through a film composite material including composites in accordance with the present invention.

With reference to FIG. 1 there is shown a film composite 10 which is suitable as for use as a shade or blind material used for the construction of sun shades or blinds which are typically located inside the windows of a building. The film composite 10 comprising a suitable transparent polymeric film layer 11 which may include including a UV absorber. A suitable transparent film is a polyester film, preferably a polyethyleneterephthalate (PET) film treated with a UV absorber as described in U.S. Pat. No. 6,221,112B so as to absorb up to 99% of UV radiation. The PET film layer has a thickness of about 0.002 in. (50 microns).

The film layer 11 on its inner surface, that is on the side away from the window, is provide with an aluminum based layer 12. The aluminium metallized layer 12 is applied by vacuum deposition and in use reflects a proportion of the light back through the window. The aluminum layer provides for some solar control and is tailored to permit a desired light transmission and may allow upto 80% transmission and typically has a visible light transmission of up to 30% and more preferably between 2-15%. In the present samples the aluminium layer 12 has an optical density of 1.4-1.15 which corresponds with a visible light transmission of between 4 & 7%.

The visible light transmission is calculated using CIE Standard Observer (CIE 1924 1931) and D65 Daylight.

The aluminium based layer 12 is coated with a layer of adhesive 13. The adhesive is a curable isocyanate terminated polyester urethane based polymer available from Rohm & Haas under the trade name Adcote 527.

A further layer 14 of transparent polymeric film is laminated over adhesive layer 13. A suitable transparent film is PET film which may be dyed to any desired colour and/or may be treated with a UV absorber as is described in U.S. Pat. No. 6,221,112B so as to absorb up to 99% of UV radiation. The further PET film layer 14 has a thickness of about) 0.001 in. (25 microns). The inner film layer 14 may be dyed to a transmit a desired percentage of light. In the present samples, the inner layer 14 was grey dyed film having a visible light transmission of 35%.

The inner layer 14 may be coated in a scratch resistant hardcoat. The preferred hard coat as is described in U.S. Pat. No. 4,557,980 the contents of which are hereby incorporated into the present specification.

In accordance with the present invention, the adhesive 13 is provide with a fire retardant together with at least one of the two polymeric film layers 11 & 14.

Where only one polymeric layer 11 or 14 contains fire retardant, it is preferred that it is the thicker film layer 11 which is preferably formed from a fire retardant PET.

Suitable fire retardant grade PET is available from Dupont under the designation Mylar XFRI or from Mitsubushi under the designation PET 1770.

It is important that the fire retardant in the adhesive is compatible with the laminate adhesive and is soluble in the adhesive solvent. Furthermore the fire retardant must not effect the haze properties of the composite which must have a haze value of less than 10% and preferably about 5% or less.

The fire retardant comprises one of a brominated material, preferably tetrabromobisphenol "A", available from Albermarle under the trade name Saytex CP2000 or a phosphorus based retardant, preferably an organophosphorus oligomer such as resorcinol bis(diphenyl phosphate) available from Akzo Nobel under the trade name Fyrolflex RDP.

The adhesive Adcote 527 has solids content of about 65% by weight and is diluted by the addition of a solvent blend of Methyl Ethyl Ketone (MEK) and Toluene in a 75:25 ratio by weigh to obtain a polymer solids content of about 20% by weight.

The fire retardant is then added and stirred into the diluted adhesive at a rate of 5-15% by weight based on the solid content, and preferably 7.5% by weight of Saytex CP2000 or 10.0% by weight of Fyrolflex RDP.

The mixed fire retardant adhesive is coated onto the aluminium layer by means of reverse gravure techniques on a roll to roll continuous coating machine using a 120-140 line count chrome plated gravure cylinder. The coating is applied at a rate of 5-6 lbs per 3000 square ft (0.008-0.010 kg per meter squared) and the solvent removed using a two zone drier or oven, the first zone being at a temperature of 180° F. (82° C.) and the second zone at a temperature of 200° F. (93°) at a linear speed of 100 ft per min (30 metres/min).

Once the adhesive coated film has exited the oven it is then laminated with the further film layer 14 using a heated combining nip roll. The nip roller comprises a chrome-plated steel roller which is heated to 170° F. (82° C.) and a rubber coated steel roller which presses against the further film layer 14 of the composite film against the heated roller.

The film composite is roller onto a storage roller at a re-wind station and put into store for at least 5 days to develop its fire retardant properties.

The film composite 10 may be embossed if desired.

Samples

Samples of the film composite were prepared and were tested for flammability.

Sample 1

This is a control sample outside of the scope of the present invention and which is similar to the Film composite 10 in which there is NO fire retardant in any layer.

Sample 2

Is also a control sample outside of the scope of the present invention and which is similar to the film composite 10 having fire retardant present in the upper PET layer 11 only.

Sample 3

This is a third control sample outside of the scope of the present invention and which is similar to the film composite 10 in which the only the adhesive layer 13 contains the fire retardant.

Sample 4

This is a sample according to the present invention having the construction shown in Film composite 10 with the upper PET layer and adhesive layer 13 both containing fire retardant.

Sample 5

This is a second sample also according to the present invention in which the film composite 10 comprises upper and lower PET layer 11 & 14 which both contain fire retardant and the adhesive layer 13 also contains fire retardant.

Flammability Test a) DIN 4102 (modified)

The Samples were tested according to DIN 4102 which was modified such that the testing took place in open air and not in the specified cabinet. For each sample, the results quoted are the average value obtained from a number of test samples.

Note a) Length is the length of burn not including shrinkage and melting away b) Time is the duration of flaming from the moment of ignition.

c) height of Flame is approximated to the nearest 5 cms.

TABLE 1

Edge Burn

| Sample | Length (cms) | Time (secs) | Flame height (cms) |
|---|---|---|---|
| 1 | 15 | 12.4 | 15 |
| 2 | 8.5 | 12 | <15 |
| 3 | 10.6 | 13 | 15 |
| 4 | 8.1 | 3.5 | <10 |

TABLE 2

Face Burn

| Sample | Length (cms) | Time (secs) | Flame height (cms) |
|---|---|---|---|
| 1 | 15.0 | 18 | 15≥ |
| 2 | 12.4 | 7 | <15 |
| 3 | 16.0 | 20 | 15≥ |
| 4 | 11.5 | 3 | <10 |

From Tables 1 & 2 it can be seen that Sample 4, which is in accordance with the present invention has the least flammability.

b) DIN 4102: Part 1: Section 6.2 (B2)
Note a) the test mark is 15 cms from the source of the flame
b) the flaming droplet test involved the potential ignition by flaming droplets of cotton wadding placed underneath the test sample

TABLE 3

Edge Burn

| Sample | Time (secs) to reach Test mark | Time | Flaming Droplets | Flame height (cms) |
|---|---|---|---|---|
| 4 | did not reach | 10 | none | 8 |
| 5 | did not reach | 6 | none | 8 |

TABLE 4

Face Burn

| Sample | Time (secs) to reach Test Mark | Time | Flaming Droplets | Flame Height |
|---|---|---|---|---|
| 4 | did not reach | 5 | none | 5 |
| 5 | did not reach | 5 | none | 4 |

Both samples 4 & 5 which are in accordance with the present invention meet the standards required by DIN 4102: B2 c) Federal Aviation Administration for Transport Category Airplanes 25.853 (a) Appendix F, Part 1, Paragraph (a) (1) (i),

TABLE 5

60 second Vertical Flammability

| | After Flame Secs | | Burn Length inches | | Drippings secs | |
|---|---|---|---|---|---|---|
| | Length | width | Length | width | Length | width |
| Sample 4 | 0.0 | 0.0 | 9.3 | 10.0 | 0.0 | 0.0 |
| Sample 5 | 0.0 | 0.0 | 9.3 | 9.5 | 0.0 | 0.0 |

The results in Table 5 show that both samples meet the requirement of FAR 25.853 (a) (1) (i) that is The average burn length may not exceed 6* inches and the average flame time after removal of the source flame may not exceed 15 seconds. Dripping from the test specimen may not continue to flame for more than 3 seconds after falling:

Appendix F to Part 25: para (8) Burn length excludes Burn lengths caused from material shrinkage and melting away from the heat source.

TABLE 6

12 Second Vertical Flammability

| | After Flame Secs | | Burn Length inches | | Drippings secs | |
|---|---|---|---|---|---|---|
| | Length | width | Length | width | Length | width |
| Sample 4 | 0.0 | 0.0 | 7.3 | 7.5 | 0.0 | 0.0 |
| Sample 5 | 2.7 | 2.4 | 6.2 | 5.9 | 0.0 | 0.0 |

The results in Table 6 show that the samples 4 & 5 meet the requirements of FAR 25.853 (a) (1) (ii) that is: the average burn length may not exceed 8 inches and the average flame time after removal of the source flame may not exceed 15 seconds.

Dripping from the test specimen may not continue to flame for more than 5 seconds after falling.

Samples 4 and 5 when tested for Haze and visible light transmission had
a) an average haze value of between 5-6%
b) an average visible light transmission of between 2-2.5%

The composite material described with reference to Samples 4 & 5 may be made into shades of any conventional construction for use in the windows of buildings to reduce light entering the building and whilst still allowing a person inside the building to see through the shade clearly to the outside. Typical shade constructions are shown in FIGS. 2-4.

Figure 2:
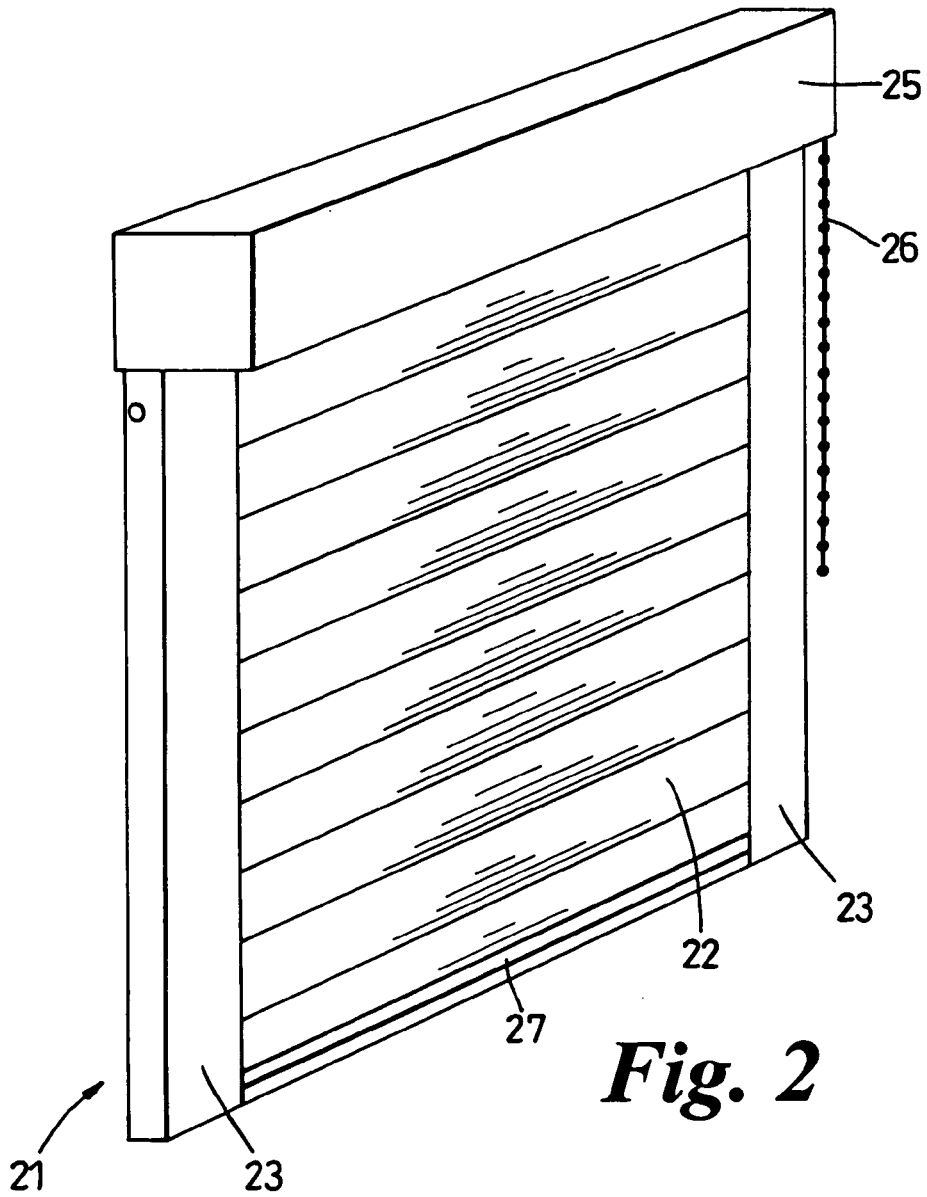
FIG. 2 is a an isometric view of a first shade also in accordance with with the present invention.

With reference to FIG. 2 there is shown a Venetian blind or shade 21 having a plurality of substantially horizontal slats 22 made from the composite material according to the present invention. The slats 22 are connected to each other in the conventional manner. The slats may be guided for movement by vertical side rails 23. The shade 21 when not in use is stored in a housing 25 which also incorporated a raising/lowering mechanism operated by a chain 26 in the conventional manner. The shade is assisted in its drop to the lowered position as shown by weight bar 27. The slats may be tilted to modulate the light in the known manner.

Figure 3:
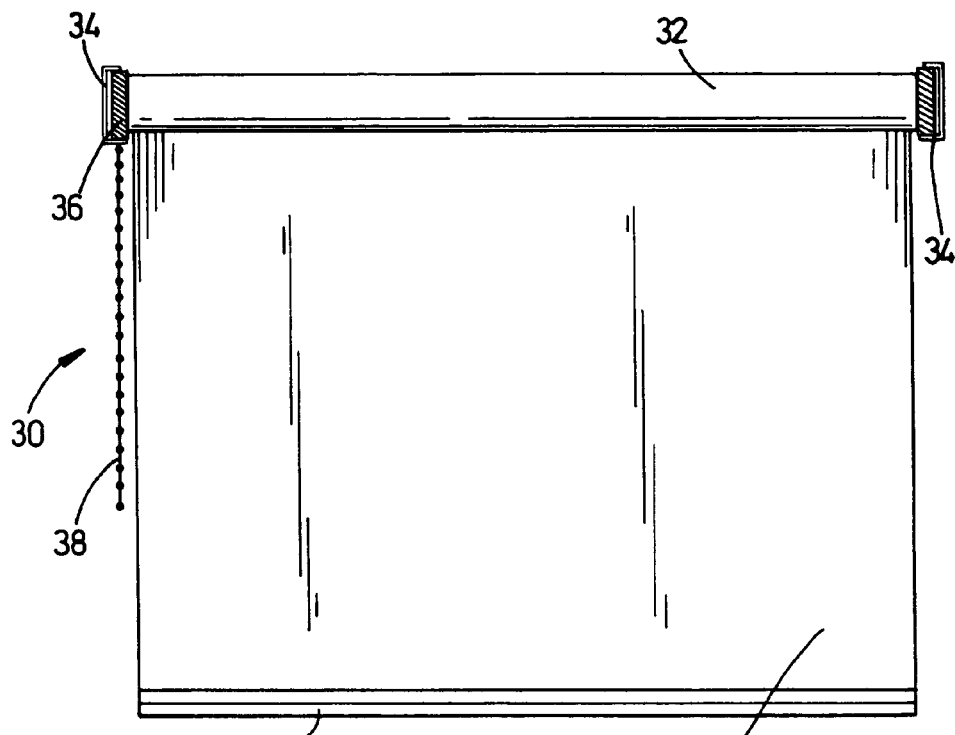
FIG. 3 is a second shade also in accordance with the present invention

FIG. 3 shows a roller blind or shade 30 formed from a film composite 31 according to the present invention, in particular the composite of sample 4 or sample 5. The blind material 31 is continuous composite film sheet mounted on a roller 32 in use secured above a window on brackets 34. The lower edge of the blind material has a weight bar 37 attached and the shade material is raised or lowered by rotation of the roller 32 by means of a clutch mechanism 36 and chain 38

Figure 4:
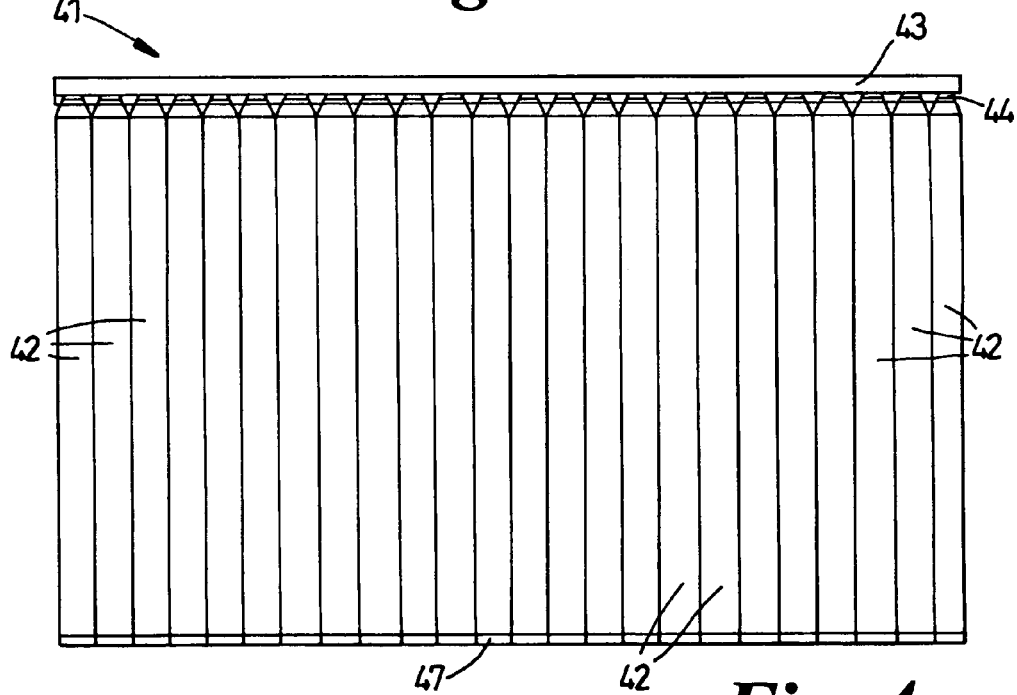
FIG. 4 is a third shade also in accordance with the present invention.

FIG. 4 shows a shade 41 comprising vertical slats 42 which hand down from a head rail 43 with the lower ends of the slats each having a weight bar 47 thereon. Each vertical slat 42 is made from a film composite according to the present invention. The head rail contains a mechanism 44 whereby all the slat can be rotated about their vertical axes to open and close the shade.

The shade film composite sheet material may be embossed to achieve particular surface effects.

Figure 5:
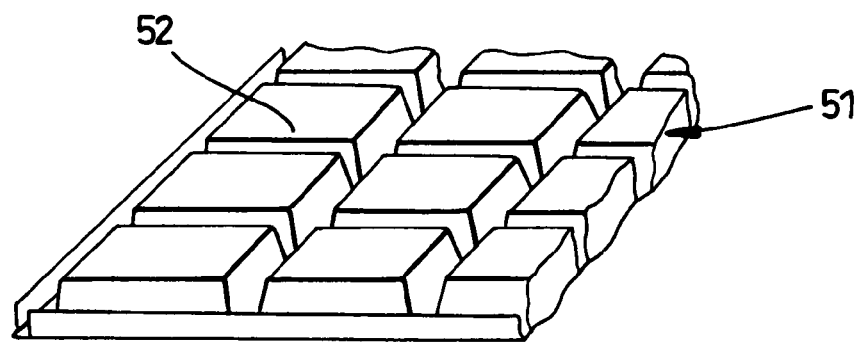
FIG. 5 is a portion of a sound absorbing film composite structure.

In another embodiment the shade material may also be used to form a dual function shade which also serves to absorb or deaden sounds inside a building. To this end the sheets 51 may be formed, by for example vacuum forming techniques, to a sheet having cup shaped indentations 52 in the manner of a grid as is shown in FIG. 5 and as is described in U.S. Pat. No. 4,425,981. This formed sheet then being used as part of a sound deadening element.

Figure 6:
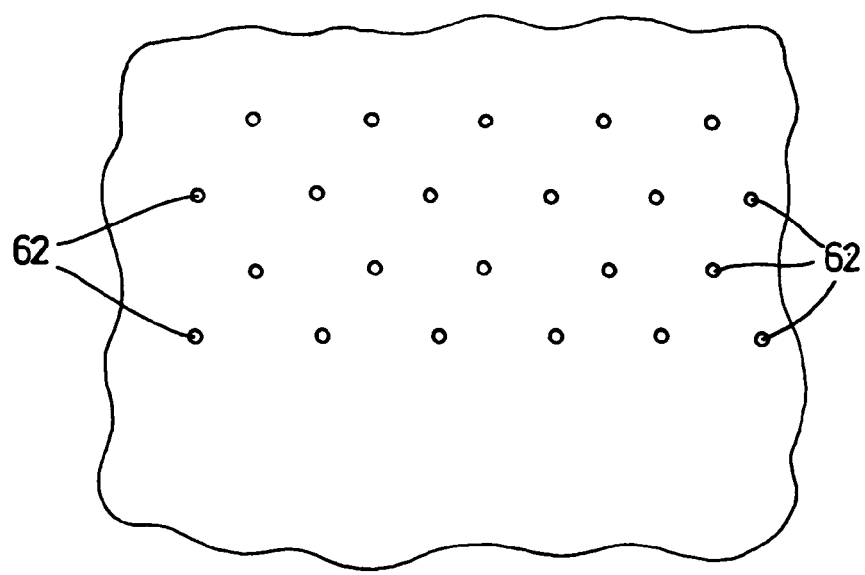
FIG. 6 is a portion of a second sound absorbing structure.

In another example as shown in FIG. 6 the film composite may also be used for the manufacture of substantially planar sound absorbing elements. The film composite 61 may be provided with a plurality of micro-perforations 62 in a similar manner to that described in U.S. Pat. No. 5,740,649 (Fuchs et al) or DE-A-10034197 or in a similar manner to that disclosed in the product sold under the Trade name "Microsorber" by the Fraunhofer Institute. The micro-perforations 62 (holes of less than 0.5 mm dia.) are formed in composite sheet material at a hole spacing of about 2.0 mm.

What is claimed is:

1. A clear transparent composite fire retardant material having an outer side in use facing the sun and an inner side in use facing away from the sun and which comprises a film composite having a first transparent PET outer film layer containing a UV absorber with a further transparent PET film layer also containing UV absorber adhered to the inner side of the first film layer using, a polyurethane resin adhesive containing 5-15% by weight Rescorcinol bis(diphenyl phosphate) fire retardant with at least one of said two PET film layers also containing fire retardant material, the composite having a visible light transmission of up to 30% and a haze value of less than 6% and meeting a fire retardant standard in accordance with German test method DIN 4102:B2.

2. A composite as claimed in claim 1 wherein the first film layer has a metallized layer on said inner side and the adhesive is applied over the metallized layer.

3. A material as claimed in claim 2 wherein the metallized layer comprises a vacuum deposition of aluminium or an aluminium alloy.

4. A material as claimed in claim 3 wherein the visible light transmission is less than 5%.

5. A material as claimed in claim 1 wherein the adhesive contains a fire retardant such that the composite has a haze of about 5%. or less.

6. A material as claimed in claim 1 having a scratch resistant layer coated onto the further film layer.

7. A sun shade as claimed in claim 6 wherein the metallized layer comprise aluminium or aluminium alloy, the two polymeric layer comprise PET film, and the composite has a haze value of less than 5%.

8. A solar control sun shade having an outer side in use facing the sun and an inner side in use facing away from the sun having as the shade material, a clear transparent film composite comprising a first transparent PET film outer layer containing a UV absorber with a further transparent PET film inner layer also containing a UV absorber adhered to the inner side of the first film layer using a polyurethane resin adhesive containing 5-15% by weight Rescorcinol bis (Diphenyl phosphate) fire retardant with at least one of said two PET film layers also containing a fire retardant material, the composite having a visible light transmission of up to 30% and a haze value of less than 6% and meeting a fire retardant standard in accordance with German test method DIN 4102:B2.

9. A sun shade as claimed in claim 8 wherein the first film layer has a metallized layer deposited on said one side thereof.

10. A sun shade as claimed in claim 8 and which also functions as a sound absorbing elements, the composite having spaced apart micro-perforations therein.

11. A sun shade as claimed in claim 8 and which also functions as a sound absorbing element wherein the composite is formed with a plurality of adjacent cup shaped recesses arranged in the form of a grid.

12. A dual function sun shade and sound absorber having spaced apart micro-perforations therein with an outer side and an inner side facing away from the sun and which comprises a transparent clear film composite having a first transparent PET outer film layer contaning a UV absorber with a further transparent PET film layer also containing a UV absorber adhered to the inner side of the first film layer using a polyurethane resin adhesive layer, containing 5-15% by weight Rescorcinol bis (dephenyl phosphate) fire retardant with at least one of said two PET film layers also containing 5-15% fire retardant material, the composite having a visible light transmission of up to 30% and a haze value of less than 6%, and meeting a fire retardant standard in accordance with German test method DIN 4102:B2.

13. A shade as claimed in claim 12 wherein the first film layer has an aluminium layer deposited on one side thereof and the micro-perforation are spaced apart 2.0 mm or less.

* * * * *